United States Patent [19]

Shin et al.

[11] Patent Number: 5,446,859

[45] Date of Patent: Aug. 29, 1995

[54] REGISTER ADDRESSING CONTROL CIRCUIT INCLUDING A DECODER AND AN INDEX REGISTER

[75] Inventors: Won G. Shin, Kangnamku; Dae H. Kim, Yeongweolkun; Jong H. Hong, Seochoku, all of Rep. of Korea

[73] Assignee: Hyundai Electronics Industries Co., Ltd., Kyoungkido, Rep. of Korea

[21] Appl. No.: 995,780

[22] Filed: Dec. 23, 1992

[30] Foreign Application Priority Data

Dec. 31, 1991 [KR] Rep. of Korea ............... 1991-26027

[51] Int. Cl.[6] ..................... G06F 12/06; G06F 13/00
[52] U.S. Cl. .................................. 395/427; 364/247.5; 364/259.9; 364/DIG. 1; 364/926.2; 364/933.4; 364/942.8; 364/DIG. 2; 395/401; 365/230.03; 365/230.06
[58] Field of Search ............. 365/230.03, 230.06; 395/400, 425; 364/247.5, 200 MS, 900 MS, 254.5, 259.9, 926.2, 933.4, 942.8

[56] References Cited

U.S. PATENT DOCUMENTS

| | | | |
|---|---|---|---|
| 4,429,374 | 1/1984 | Tanimura | 365/230.06 |
| 4,723,228 | 2/1988 | Shah et al. | 365/230.06 |
| 4,758,993 | 7/1988 | Takemae | 365/230.03 |
| 4,881,206 | 11/1989 | Kadono | 365/230.03 |
| 4,961,172 | 10/1990 | Shubat et al. | 365/230.06 |
| 4,982,372 | 1/1991 | Matsuo | 365/230.06 |
| 4,984,213 | 1/1991 | Abdoo et al. | 365/230.06 |
| 5,036,493 | 7/1991 | Nielson | 365/230.03 |
| 5,282,172 | 1/1994 | Hilton | 365/230.03 |
| 5,319,606 | 6/1994 | Bowen et al. | 365/230.06 |

*Primary Examiner*—Glenn Gossage
*Assistant Examiner*—Frank J. Asta
*Attorney, Agent, or Firm*—Darby & Darby

[57] ABSTRACT

A register or memory control circuit for selecting registers using a reduced number of address lines. The register control circuit partitions registers into blocks and utilizes a decoder and an index register to select individual registers. An additional decoder may be used in conjunction with the index register in order to further increase the number of registers which may be selected by the register control circuit. The index register provides index data signals on "n" output lines. Each of the "n" index register output lines is connected to a corresponding one of "n" register blocks, so that the "n" output lines of the index register and (n−1) output lines of the decoder can address (n−1)n registers.

2 Claims, 3 Drawing Sheets

REGISTER ADDRESSING CONTROL CIRCUIT INCLUDING A DECODER AND AN INDEX REGISTER

BACKGROUND OF THE INVENTION

1. Field of the Invention

The present invention relates to a register control circuit.

2. Description of the Prior Art

Generally, a variety of active devices such as, for example, CPU, CRTC, modem and etc. comprise therein registers for control of various functions, respectively. Recently, as the functions of the devices have become complex and diversified, more registers have been present for control of the functions. For the purpose of control of such a number of registers, there has been proposed a method of using a number of addresses thereby to increase an integration of the device and to reduce the number of pins of the device.

Referring to FIG. 1, there is shown a 16-CE (CHIP ENABLE) logic utilizing a 4×16 decoder, as a representative one of conventional methods of controlling the registers in the devices. In the method in FIG. 1, for example, at least 4 addresses are required to control 16 internal registers. Similarly, 6 addresses may be required to control 64 registers. In other words, a number of addresses are required to control the registers, resulting in a complexity of the circuit. In order to make up for such a drawback, there may be used an index register, as will be described later.

Referring to FIG. 2, there is shown a block diagram of a conventional register control circuit utilizing index registers. Each of the index registers is used as a pointer for indicating registers in a corresponding one of register blocks. In this case, addresses are required merely to designate the index registers. However, the conventional register control circuit in FIG. 2 has a disadvantage, in that a pointer value corresponding to an address of a register to be control led is written into the corresponding index register whenever the register control operation is performed.

SUMMARY OF THE INVENTION

Therefore, the present invention has been made in view of the above problems, and it is an object of the present invention to provide a register control circuit for classifying registers into a plurality of blocks and controlling enable signals to the plurality of register blocks using one index register.

In accordance with one aspect of the present invention, the above and other objects can be accomplished by a provision of a circuit for controlling n (n>4) register blocks, each of the n register blocks having n−1 registers, said circuit comprising: a decoder having n output lines, the n−1 output lines of which are connected to said n−1 registers in each of said n register blocks, respectively; and an index register having an input terminal connected to the remaining one output line of said n output lines of said decoder and n output lines, each connected to said n−1 registers in a corresponding one of said n register blocks; whereby the number of the controllable register blocks is n at a maximum.

In accordance with another aspect of the present invention, there is provided a circuit for controlling $2^n$ (n≧4) register blocks, each of the $2^n$ register blocks having n−1 registers, said circuit comprising: a first decoder having n output lines, the n−1 output lines of which are connected to said n−1 registers in each of said $2^n$ register blocks, respectively; an index register having an input terminal connected to the remaining one output line of said n output lines of said first decoder and n output lines; and a second decoder having n input terminals connected to said n output lines of said index register, respectively, and $2^n$ output lines, each connected to said n−1 registers in a corresponding one of said $2^n$ register blocks; whereby the number of the controllable register blocks is $2^n$ at a maximum.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
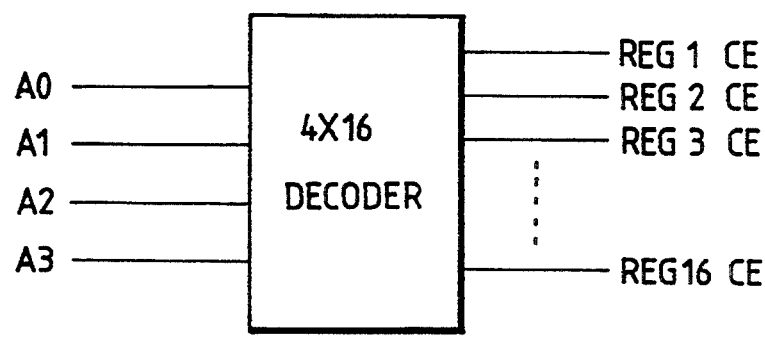
FIG. 1 is a view illustrating a 16-CE logic utilizing a 4×16 decoder in accordance with the prior art.
Figure 2:
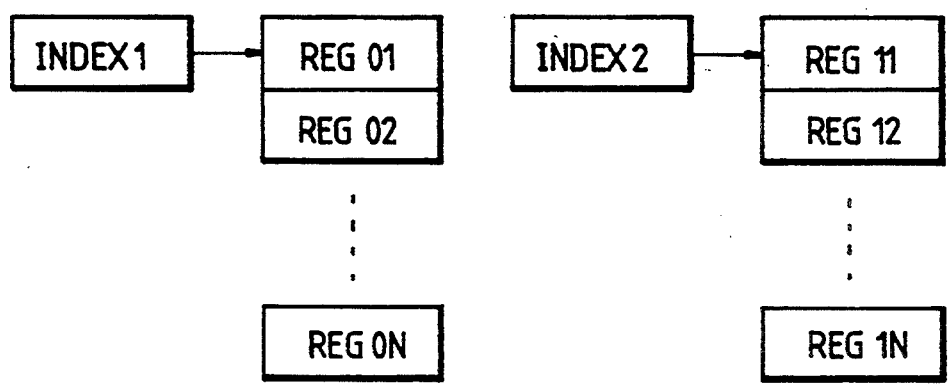
FIG. 2 is a block diagram of a conventional register control circuit utilizing index registers.
Figure 3:
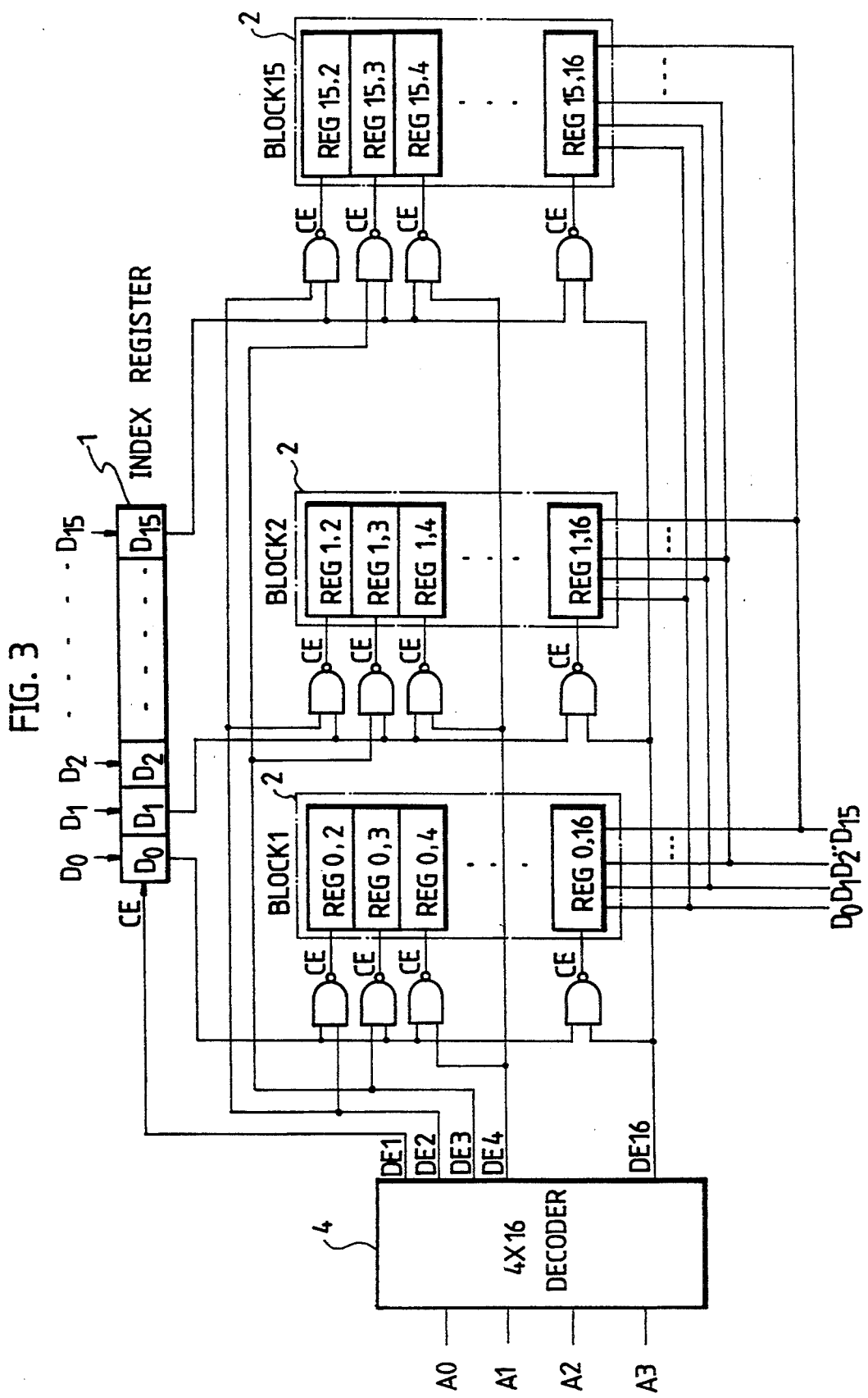
FIG. 3 is a block diagram of a register control circuit utilizing an index register in accordance with an embodiment of the present invention.

Referring to FIG. 3, there is shown a block diagram of a register control circuit utilizing an index register in accordance with an embodiment of the present invention. As shown in this figure, the register control circuit comprises an index register 1 for receiving one of 16 outputs of a 4× 16 decoder 4, the other 15 outputs of which are applied as chip enable signals CE to register blocks 2. Utilizing 4 address pins and one index register makes it possible to control the register blocks in the same number as that of bits of the index register. The 4×16 decoder 4 receives 4 address input signals and generates 16 output signals, one of which is applied as the chip enable signal CE to the index register 1 and the other of which are applied as the chip enable signals CE to the register blocks 2. Using the 4 address pins and the 16-bit index register, the total number of the controllable registers is 240 (15×16). Therefore, in accordance with the present invention, the plurality of chips can be controlled; besides, the pins can be reduced in number and the integration can be increased in the design of the chip, resulting in reduction in development and manufacturing costs.

Figure 4:
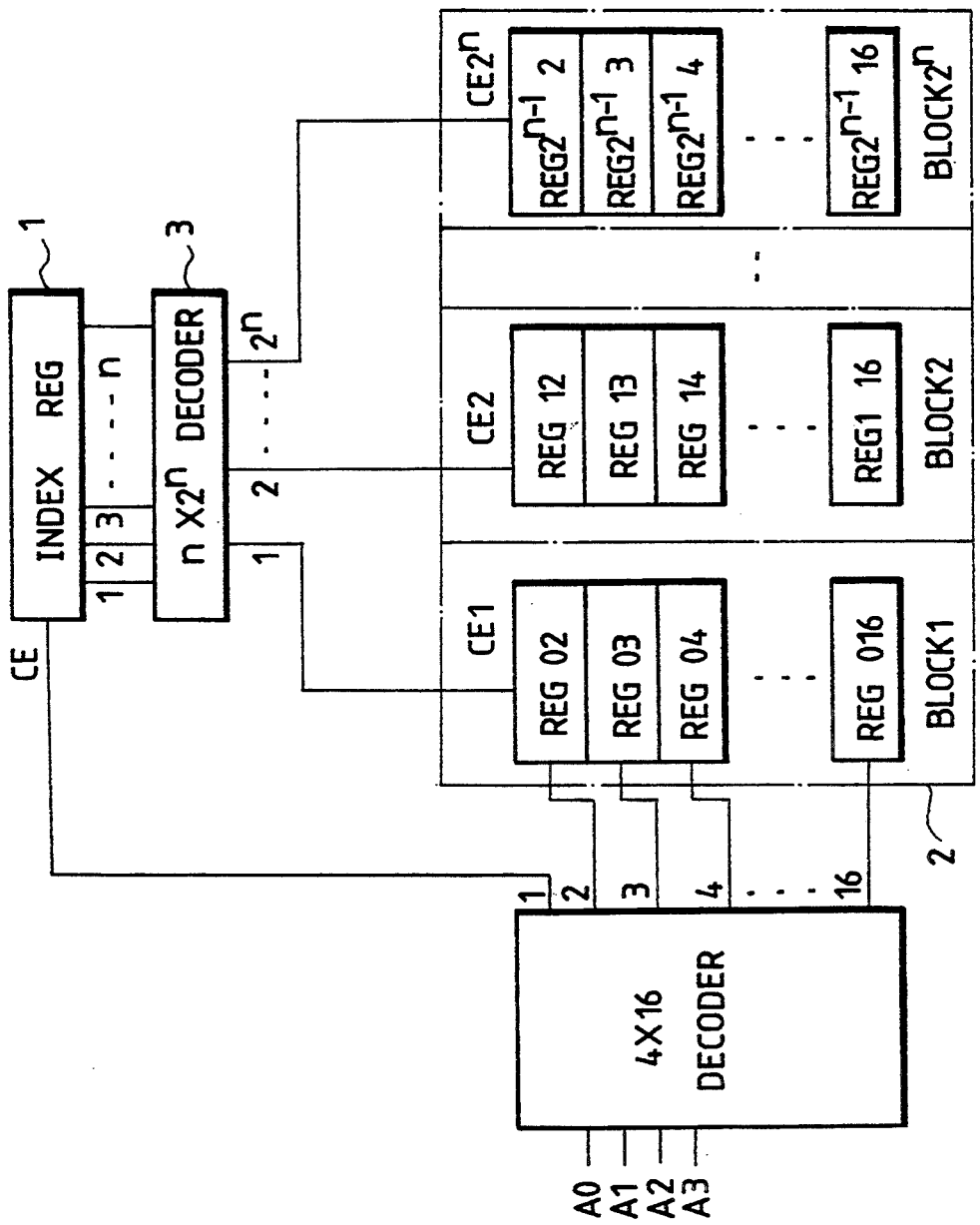
FIG. 4 is a block diagram of a register control circuit utilizing a n×$2^n$ decoder in addition to the index register in accordance with an alternative embodiment of the present invention.

Referring to FIG. 4, there is shown a block diagram of a register control circuit utilizing a n×$2^n$ decoder in addition to the index register in accordance with an alternative embodiment of the present invention. As shown in this drawing, the register control circuit comprises a n×$2^n$ decoder 3 connected between the index register 1 and the register blocks 2. Outputs of the n×$2^n$ decoder 3 all are used as the chip enable signals CE to the register blocks 2. As a result, the number of the controllable register blocks 2 can be extended to $2^n$ at a maximum. Herein, n is the number of bits of the index register 1.

For example, provided that 4 address pins and 16-bit index register are used, the total number of the controllable registers is 983040 (15 registers $\times 2^{16}$ blocks).

In accordance with the present invention, for a write or read operation of data into or from a desired register, a value corresponding to the block of the desired register must first be written into the index register 1, the address of which is OH. The following table (1) shows the block selection in the use of the index register 1 of 3 bits. In the case of the 3-bit index register, the number of the controllable blocks is 8 ($2^3=8$).

TABLE 1

| Index Register | | | |
| --- | --- | --- | --- |
| Bit 2 | Bit 1 | Bit 3 | Selected Block |
| 0 | 0 | 0 | block 1 |
| 0 | 0 | 1 | block 2 |
| 0 | 1 | 0 | block 3 |
| 0 | 1 | 1 | block 4 |
| 1 | 0 | 0 | block 5 |
| 1 | 0 | 1 | block 6 |
| 1 | 1 | 0 | block 7 |
| 1 | 1 | 1 | block 8 |

In accordance with the present invention, one of the register blocks is chip-enabled in response to the corresponding output signal from $n \times 2^n$ decoder 3 under the condition that the index register 1 is set. As a result, the control data can be written into the addressed locations 1H-0FH of the corresponding register in the enabled register block.

As hereinbefore described, according to the present invention, the plurality of register blocks cannot be chip-enabled simultaneously and the function of the chip can be performed very readily. Also, the decoder is adapted for controlling only the one index register 1, thereby to control the plurality of register blocks 2. Therefore, with a small number of pins, the design of a multi-function chip is enabled and various functions can be implemented by a piece of chip in the design of an I/O device. Furthermore, the present invention makes possible the design of a special purpose memory chip requiring a small number of pins.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A register addressing circuit for addressing (n−1)n registers arranged as n register blocks, each register block having (n−1) registers, comprising:
    a decoder having n output lines and m input lines, wherein $2^{\wedge}m=n$, each of said m lines receiving an address signal, (n−1) of said n output lines being connected to (n−1) registers of each of said n register blocks; and
    an index register with a chip enable input line connected to the nth output line of said decoder, said index register providing index data signals on n output lines, one each of said n index register output lines connected to a corresponding one of said n register blocks, so that the n output lines of the index register and the (n−1) output lines of the decoder are capable of addressing (n−1)n registers.

2. A register addressing circuit for addressing (n−1)$2^{\wedge}$n registers arranged as $2^{\wedge}$n register blocks, each register block having (n−1) registers comprising:
    a first decoder having n output lines and m input lines, wherein $2^{\wedge}m=n$, each of said m lines receiving an address signal, (n−1) of said n output lines being connected to (n−1) registers of each of said $2^{\wedge}$n register blocks;
    an index register with a chip enable input line connected to the nth output line of said decoder, said index register providing index data signals on n output lines; and
    a second decoder having n input lines connected to the n output lines of the index register, and $2^{\wedge}$n output lines, one each of said $2^{\wedge}$n output lines connected to a corresponding one of said $2^{\wedge}$n register blocks, so that the $2^{\wedge}$n output lines of the second decoder and the (n−1) output lines of the first decoder are capable of addressing (n−1)$2^{\wedge}$n registers.

* * * * *